(12) United States Patent
Liu et al.

(10) Patent No.: US 8,218,237 B2
(45) Date of Patent: Jul. 10, 2012

(54) REAR-PROJECTION DISPLAY (75) Inventors: Zhiqiang Liu, Kirkland, WA (US);
Prafulla Masalkar, Issaquah, WA (US);
Karlton Powell, Lake Stevens, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/188,185

(22) Filed: Jul. 21, 2011

(65) Prior Publication Data

US 2012/0019789 A1    Jan. 26, 2012

Related U.S. Application Data (63) Continuation of application No. 12/607,649, filed on Oct. 28, 2009, now Pat. No. 8,004,760.

(51) Int. Cl.
*G03B 21/60* (2006.01)

(52) U.S. Cl. ......... 359/460; 359/443; 359/457; 359/459

(58) Field of Classification Search .......... 359/615–620, 359/626, 443–599
See application file for complete search history.

(56) References Cited

U.S. PATENT DOCUMENTS

| | | | |
|---|---|---|---|
| 5,781,344 A | 7/1998 | Vance | |
| 6,220,713 B1 | 4/2001 | Tadic-Galeb et al. | |
| 6,710,941 B2 | 3/2004 | Hennen et al. | |
| 7,009,766 B2 * | 3/2006 | Hirata et al. | 359/455 |
| 7,196,845 B2 | 3/2007 | Kokuzawa et al. | |
| 7,499,214 B2 | 3/2009 | Novet et al. | |
| 2008/0212178 A1 * | 9/2008 | Katsura et al. | 359/460 |
| 2009/0040605 A1 * | 2/2009 | Katsura et al. | 359/457 |
| 2009/0046303 A1 | 2/2009 | Dimitrov-Kuhl et al. | |

FOREIGN PATENT DOCUMENTS

JP    2007086774    * 1/2007

OTHER PUBLICATIONS

Jacobsen, Gary A., "First Novel Invention of Inline Web Fed Roll Print Manufacturing Production of Animated / Three Dimensional Imaged Print Products Incorporating Advanced Lenticular Transparent Substrate . . . Its Advantages and the Comparison / Contrast Order Analysis to Prior U.S.P.T.O. Patented Art", retrieved at <<http://www.lenticlearlens.com/patent/papers.pdf>>, Apr. 11, 2004, pp. 272.

"Concord Camera Launches a New Zoom Digital Camera with Folded Optics Design", retrieved at <<http://www.dcviews.com/press/Concord_3340Z.htm>>, Mar. 12, 2003, p. 1.

Davidhazy, Andrew, "Canon Digital Rebel vs. Fuji IS-1 Infrared Capable Camera", retrieved at <<http://people.rit.edu/andpph/text-canon-fuji-IR-comparison.html>>, Aug. 11, 2009, pp. 3.

* cited by examiner

*Primary Examiner* — Clayton E Laballe
*Assistant Examiner* — Kevin Butler
(74) *Attorney, Agent, or Firm* — Alleman Hall McCoy Russell & Tuttle LLP (57) ABSTRACT

Various embodiments related to rear-projection image display are disclosed. For example, one disclosed embodiment provides a projector for projecting an image and a screen configured to display the image. The screen comprises a filter layer having a light reception side and an image display side. The filter layer includes an array of trapezoidal transmissive elements and an array of trapezoidal absorption elements, where a wider base of each of the trapezoidal transmissive elements faces the light reception side of the filter layer, and where a wider base of each of the trapezoidal absorption elements faces the image display side of the filer layer.

14 Claims, 6 Drawing Sheets

REAR-PROJECTION DISPLAY

CROSS-REFERENCE TO RELATED APPLICATIONS

This application is a continuation of U.S. patent application Ser. No. 12/607,649, titled "REAR-PROJECTION DISPLAY" and filed Oct. 28, 2009, the entire disclosure of which is hereby incorporated by reference.

BACKGROUND

Rear-projection display systems may be of many different sizes and configurations, and may vary according to any number of factors. Examples of such factors include, but are not limited to, display screen orientation, intended user viewing angle, optical system used for projection, angle of incidence of light projected onto the display screen, etc.

Depending upon the optics used to deliver a projected image to a rear projection screen, ghost images may interfere with a viewing experience. A ghost image appears on the display screen as an offset replica of the projected image. A ghost image may be formed, for example, when a projected image ray encounters an interface between media having differing refractive indices. At such an interface, one portion of the image ray may be refracted while another portion is reflected. The reflected portion, or the ghost ray, may reflect off other surfaces within the projection system and thereby appear on the display screen.

SUMMARY

Accordingly, various embodiments are disclosed herein that relate to rear-projection image display. For example, one disclosed embodiment provides a rear-projection display system comprising a projector for projecting an image and a screen configured to display the image. The screen comprises a filter layer having a light reception side and an image display side. The filter layer includes an array of trapezoidal transmissive elements and an array of trapezoidal absorption elements, where a wider base of each of the trapezoidal transmissive elements faces the light reception side of the filter layer, and where a wider base of each of the trapezoidal absorption elements faces the image display side of the filer layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, a rear-projection display may be of many different sizes and configurations. For example, in some embodiments, a rear-projection display system may take the form of a surface computing system comprising a horizontally-oriented display screen configured to display images to one or more users seated or standing around the display screen. The surface computing device also may be configured to receive touch inputs made on the display screen.

Depending upon the use environment, the display screens of such surface computing devices may be sizeable, and therefore may be subject to deformation due to gravity, users touching, leaning on or placing drinks and/or other objects on the screen, and other factors not ordinarily encountered by vertically-oriented rear projection display screens. Further, a horizontally-oriented display screen also may have other use constraints not ordinarily present for vertically-oriented display screens. For example, because viewers of a horizontal display screen may sit around the screen, the viewers may view the screen from the side, rather than from the front. Therefore, it may be desirable to direct a greater intensity of light toward the sides of the display screen. Further, the optical systems used to deliver an image to the display screen may produce ghost images with different characteristics than those produced in a vertically-oriented rear projection system.

Therefore, embodiments of rear-projection display screens are presented herein that may help to resist mechanical deformation, reduce ghost image presentation, and distribute light intensity for a horizontally-oriented rear projection display system such as a surface computing device. While disclosed herein in the context of a horizontally-oriented rear projection display system, it will be understood that the embodiments described herein may be used in any other suitable use environment, including, but not limited to, vertically-oriented displays and displays having other suitable orientations.

Figure 1:
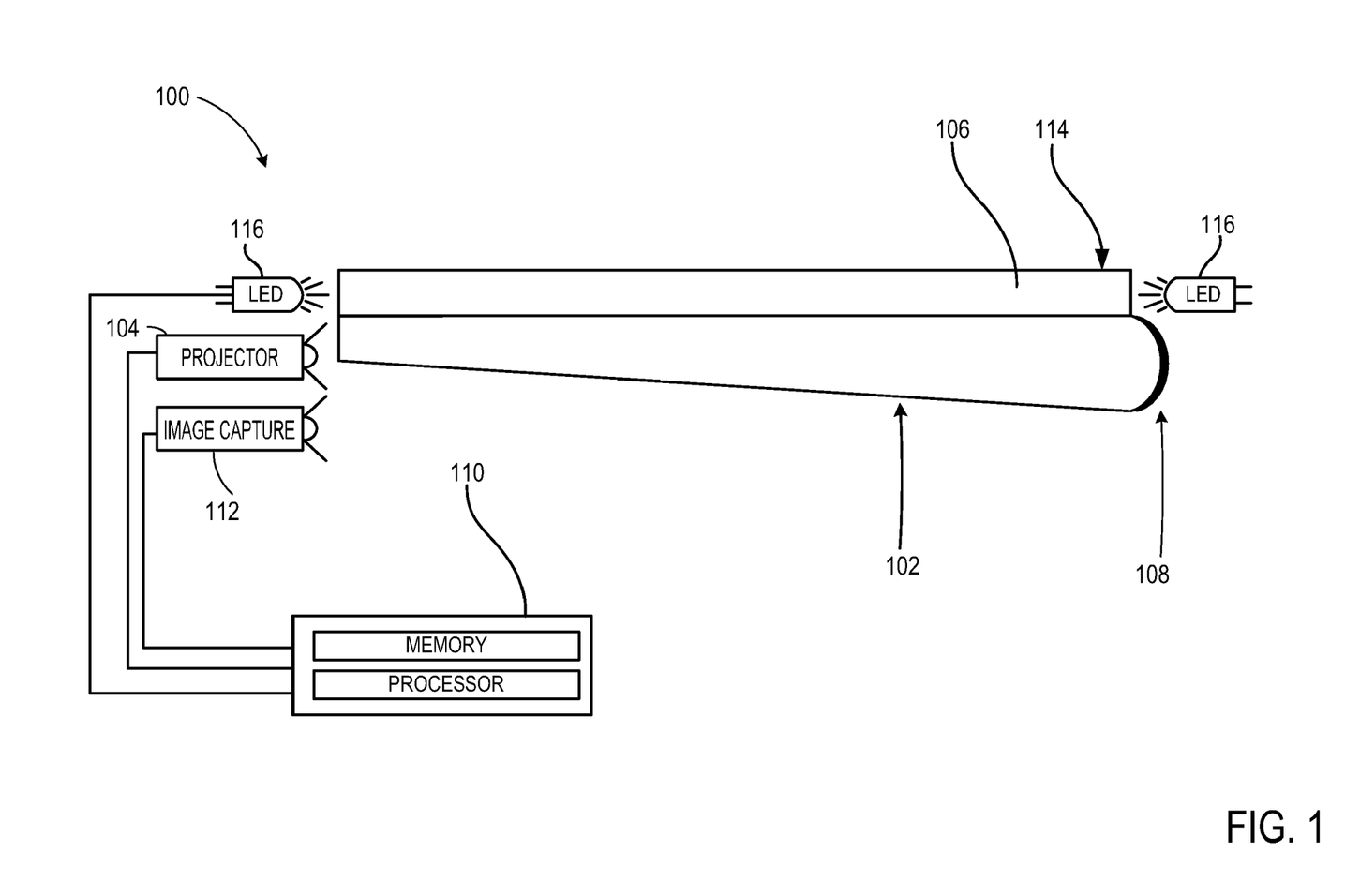
FIG. 1 shows an embodiment of a rear-projection display system.

FIG. 1 shows an example embodiment of a rear-projection display system 100 comprising an optical wedge 102 configured to deliver light projected by projector 104 to a display screen 106 via total internal reflection. The depicted optical wedge 102 comprises an internal reflector 108 configured to form a folded optical path within the optical wedge 102, such that the entire surface of the optical wedge 102 may be used for image projection. Rear-projection display system 100 further comprises a controller 110 configured to control the display of an image via projector 104.

Rear-projection display system 100 further comprises a vision-based touch-detection system configured to enable the detection of multiple temporally overlapping touch inputs. In the embodiment shown in FIG. 1, the vision-based touch detection system comprises an infrared light source configured to illuminate the display screen 106 with infrared light, and one or more image capture devices 112 configured to capture an image of a backside of display screen 106 via infrared light reflected from an object on display screen 106 into optical wedge 102. It will be appreciated that, in some embodiments, the image capture devices may be configured to capture an image of a frontside of the display screen based on one or more focusing characteristics of the vision-based touch detection system.

Any suitable light source may be used to illuminate the display screen with infrared light. For example, in the depicted embodiment, a plurality of infrared light-emitting diodes 116 may be arranged along one or more edges of the display screen to inject infrared light into the display screen. Additionally or alternatively, some embodiments may incorporate a light source to provide an infrared backlight for illuminating the display screen.

The light injected into the display screen may leak out of the display screen, thereby allowing the light to be reflected into the optical wedge 102 by any objects on the display surface 114. While disclosed herein in the context of a horizontally-oriented display system, it will be understood that an optical wedge also may be used to deliver a projected image to a display screen having any other suitable orientation. Further, it will be understood that the display screen embodiments disclosed herein may be used in any other suitable use environment.

Figure 2:
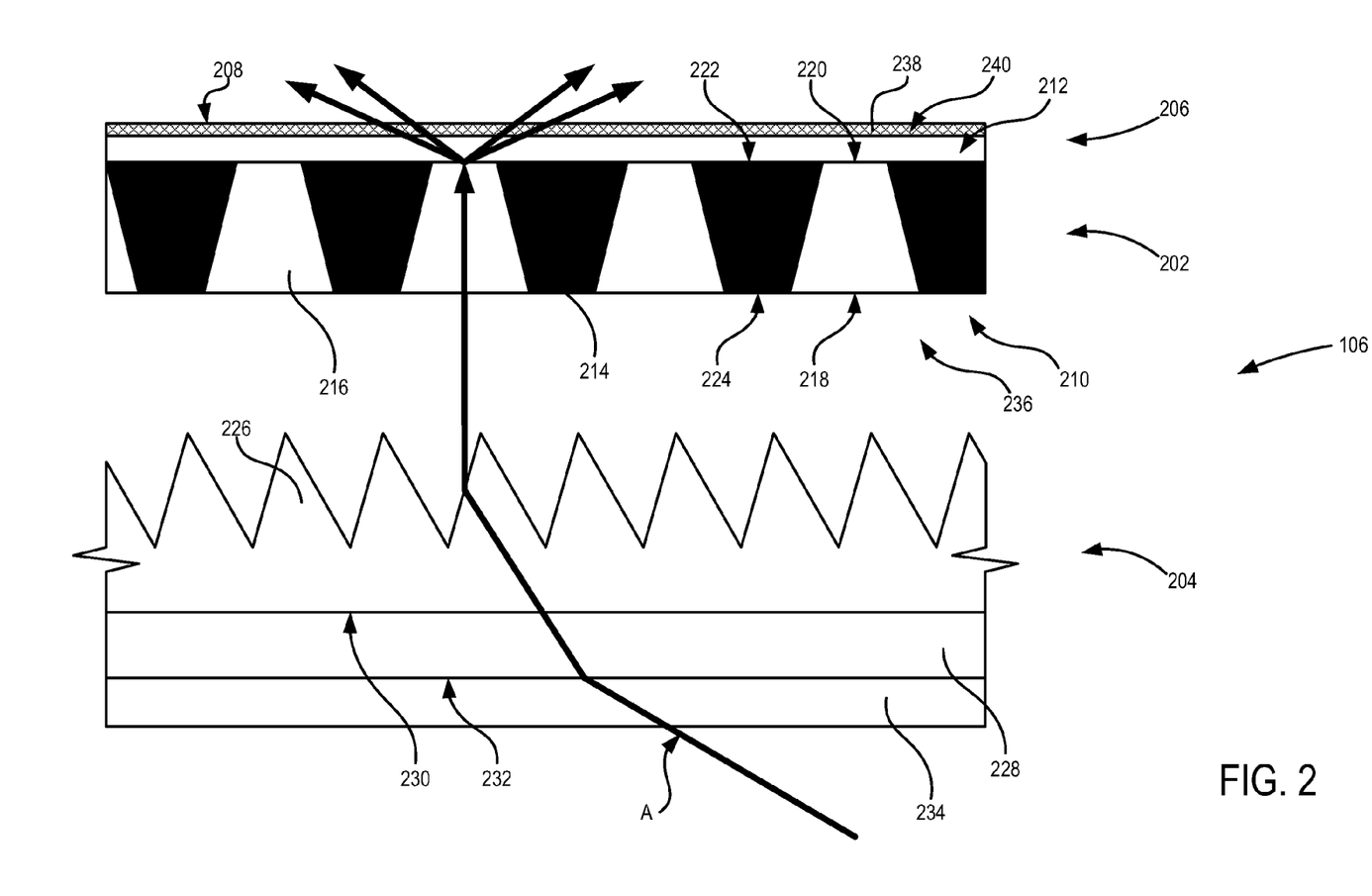
FIG. 2 shows an embodiment of an image display screen.

The optical system of rear-projection display system 100 includes various interfaces between materials of differing refractive indices (e.g. wedge/air interfaces, interfaces between any cladding layers disposed on the wedge, etc.) that may cause some light to be reflected at such interfaces. This reflected light may then reflect from other interfaces in the system back toward the display screen, thereby leading to ghost images. Further, as light exits the optical wedge 102 of rear-projection display system 100 at the critical angle for total internal reflection, such light arrives at display screen 106 at a relatively high angle of incidence relative to the display screen normal. This also may cause issues with ghost images. Therefore, display screen 106 may be configured to block such ghost images. FIG. 2 illustrates an embodiment of display screen 106 in more detail, and illustrates the path taken through display screen by an example ray "A" of light projected by projector 104.

Display screen 106 includes a filter layer 202 for filtering undesired light, such as ambient light and ghost images; a lens sheet 204 for redirecting light received from the optical wedge 102 (or other suitable light delivery system) toward a direction normal to a viewing surface of display screen 106; and a light diffuser 206 for diffusing light received from the filter layer 202. It will be appreciated that the sizes of the various parts depicted in FIG. 2 are neither to scale nor intended to represent any size relationships among those parts, but instead are sized to clarify the arrangements and the locations of the depicted parts.

Filter layer 202 includes light reception side 210 and an opposing image display side 212. Image display side 212 is positioned to face display surface 208 of display screen 106, while light reception side 210 is positioned to receive projected light from lens sheet 204. Filter layer 202 also includes an array of trapezoidal absorption elements 214 interspersed with an array of trapezoidal transmissive elements 216 to transmit projected light to display surface 208 while filtering ghost images from the light projected to display surface 208.

Filter layer 202 acts to filter ambient light incident at display surface 208 from the projection system that might otherwise lead to reflection of the ambient light back to display surface 208 with an accompanying loss in contrast. Each transmissive element of the array of trapezoidal transmissive elements 216 has a wider base 218 facing light reception side 210 of filter layer 202 and a narrower base 220 facing image display side 212 of filter layer 202.

Trapezoidal transmissive elements 216 are configured to have a higher transmittance than absorbance of one or more visible wavelengths of light. In contrast, trapezoidal absorption elements 214 are configured to have a higher absorbance than transmittance of one or more visible wavelengths of light to absorb ambient light incident at display surface 208 and to absorb ghost images formed elsewhere in the projection system. Each absorptive element of the array of trapezoidal absorption elements 214 has a wider base 222 facing image display side 212 of filter layer 202 and a narrower base 224 facing light reception side 210 of filter layer 202.

Trapezoidal absorption elements 214 further may be configured to have a higher transmittance of one or more wavelengths of infrared light than of one or more wavelengths of visible light. For example, if light source 116 is configured to produce infrared light, the infrared light produced may be reflected by objects touching display surface 208 so that display screen 106 is sensitive to a user touch, to an object placed on display surface 208, etc. Thus, if trapezoidal absorption elements 214 have a higher transmittance of one or more wavelengths of infrared light than of one or more wavelengths of visible light, trapezoidal absorption elements will transmit a greater quantity of reflected infrared light for capture by image capture device 112 while absorbing one or more wavelengths of visible light, which may reduce the occurrence of ghost images formed by reflected ambient light. Further, in some embodiments, the trapezoidal absorption elements may be configured to have a higher transmittance than absorbance of one or more wavelengths of infrared light, providing a greater transmission efficiency of infrared light.

Trapezoidal absorption elements 214 may have any suitable structure. For example, the trapezoidal absorption elements 214 may be formed from or otherwise include an ink, dye or pigment that absorbs light in the visible spectrum while transmitting light in the infrared spectrum. The ink, dye or pigment may be incorporated into at least a portion of each absorptive element of the array of trapezoidal absorption elements 214; may be printed, coated, or adhered to either wider base 222 or narrower base 224 of each absorptive element of the array of trapezoidal absorption elements 214; or may be incorporated into filter layer 202 in any other suitable manner. In other embodiments, the trapezoidal absorption elements may comprise a multilayer dielectric filter, or any other suitable filtering mechanism than an absorbing ink, dye or pigment.

The array of trapezoidal absorption elements 214 and the array of trapezoidal transmissive elements 216 are arranged as a one-dimensional (1D) array in FIG. 2. It will be appreciated that the array of trapezoidal absorption elements may be in any suitable arrangement. For example, in some embodiments where projected light is close to telecentric and where ghost image generation occurs in more than one dimension, a two-dimensional (2D) array of cone-shaped trapezoidal absorption elements may be employed.

As mentioned above, FIG. 2 shows lens sheet 204 being spaced from filter layer 202. Lens sheet 204 comprises a 2D Fresnel lens 226 for redirecting light received from the projector toward a direction normal to the surface of the display screen 106. Some embodiments of the display screen may use a 1D turning film. For example, an embodiment used with an optical wedge may include a linear or a nearly-linear turning film in use cases where the projected light is nearly telecentric.

In the depicted embodiment, lens sheet 204 also comprises a rigid mechanical strength layer 228 having a first side 230 and a second side 232. Fresnel lens 226 is positioned to receive projected light from the second side of rigid mechanical strength layer 228 and to transmit the projected light received to light reception side 210 of filter layer 202. The Fresnel lens 226 may be connected to rigid mechanical strength layer 228 in any suitable manner. For example, the Fresnel lens 226 may be bonded, fused, glued, etc. to rigid mechanical strength layer 228.

Rigid mechanical strength layer 228 comprises a mechanically rigid material, providing mechanical support for display screen 106 to resist screen bowing or sagging from user touches to display surface 208, from objects placed on display surface 208, from the weight of display screen 106, etc. This may help to prevent damage to display screen 106 from such factors, and also may help to preserve image quality, which may suffer if display screen 106 deforms.

In some rear-projection display screens without such a mechanical strength layer, the back surface (i.e. the surface that faces away from a viewer) of a Fresnel lens sheet is roughened to avoid reflections that could lead to ghosting, as well as avoiding aliasing and/or Moiré effects occurring between a projection image pixel pitch and a facet pitch of the Fresnel lens. However, the presence of the mechanical strength layer 228 increases a distance between such a roughened surface and the filter layer 202. Where the surface of the mechanical strength layer is roughened, the diffusion of light caused by the roughened surface may result in a portion of the projected light falling onto transmissive absorption elements 214 in filter layer 202. This may result in reduced light transmission to display surface 208, display of a blurry image at display surface 208, problems with vision-based touch detection, etc.

Therefore, in some embodiments, second side 232 of rigid mechanical strength layer 228 may be smooth, rather than roughened, to reduce diffusion of the projected image onto the trapezoidal absorption elements 214. Further, an anti-reflective layer 234 may be disposed on second side 232 of rigid mechanical strength layer 228 to combat ghost images that otherwise may be caused by reflection from the smooth surface of rigid mechanical strength layer 228. Anti-reflective layer 234 may comprise any suitable material or materials. For example, in some embodiments, the anti-reflective layer 234 may comprise a multi-layer dielectric anti-reflective structure.

Figure 3:
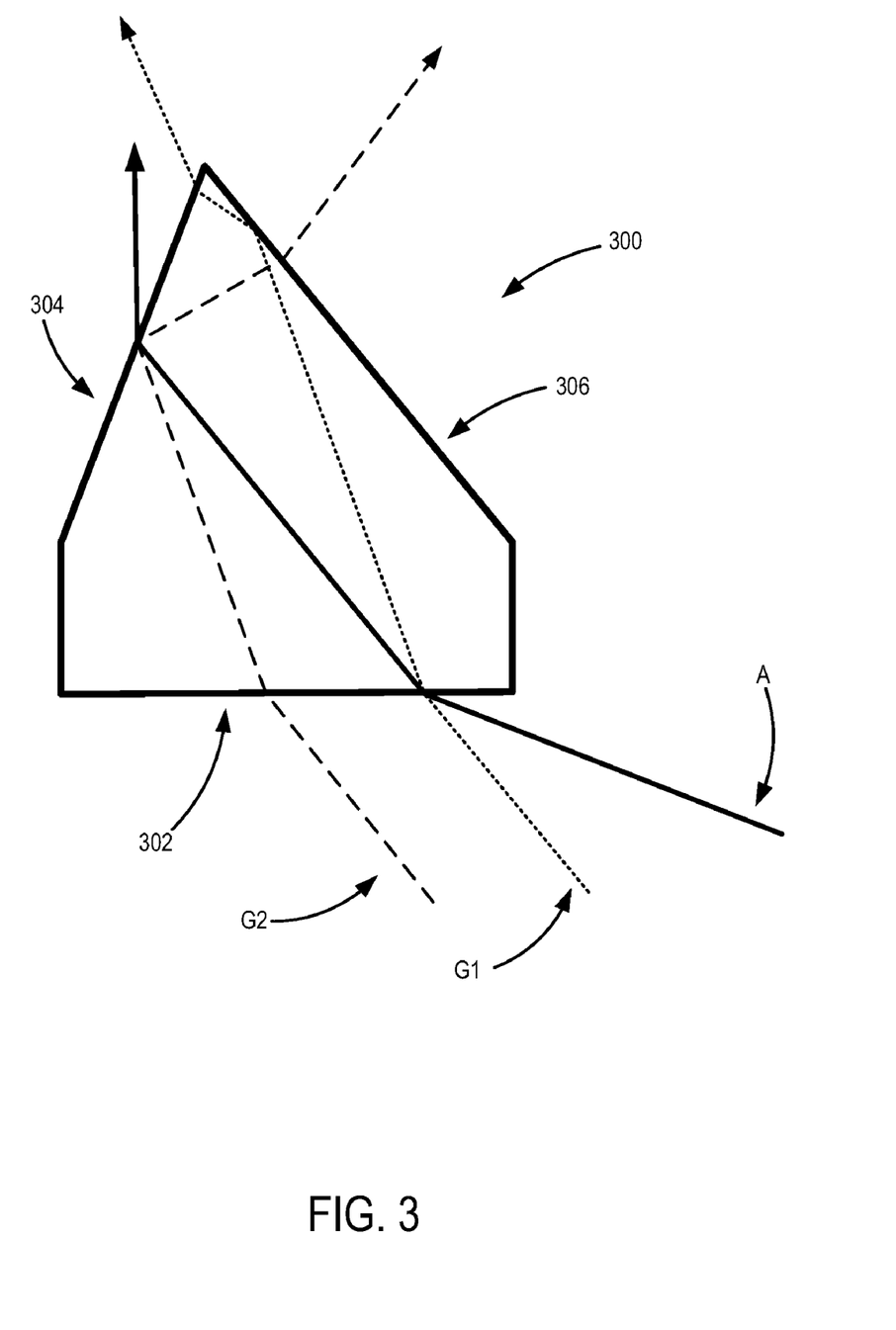
FIG. 3 shows a representative portion of an embodiment of a Fresnel lens.

As discussed above, light reception side 210 of filter layer 202 is positioned to receive projected light exiting Fresnel lens 226, so that ambient light and ghost images are filtered from the projected images. A representative portion 300 of an embodiment of a Fresnel lens from lens sheet 204 is shown in FIG. 3. Image ray A, shown entering base 302 of Fresnel lens portion 300, refracts in the lens before exiting at facet 304 toward filter layer 202. Two ghost image rays that may arise from the optical wedge 102 depicted in FIG. 1 are also shown in FIG. 3. One ray is referred to as "low-angle ghost ray" and the other is referred to as "high-angle ghost ray" based upon the angles relative to the display screen normal at which the ghost rays exit the Fresnel facet. Low-angle ghost image ray G1 enters base 302 at the same entry point as image ray A, but at a different entry angle. Thus, low-angle ghost ray G1 is internally reflected at facet 306 before being emitted at facet 304.

To address low-angle ghost image rays, some rear-projection displays employ a one-dimensional lenticular lens array (not shown) for directing low-angle ghost image rays toward an array of absorbing filter elements. The filter elements include wavelength selective dyes or inks arranged as absorbing stripes running parallel to the one-dimensional lenses of the lenticular array.

However, such a lenticular lens arrangement may be unsuitable for addressing high-angle ghost image rays. Referring to FIG. 3, high-angle ghost image ray G2 enters at a position on base 302 offset from the entry point of low-angle ghost image ray G1 and image ray A. High-angle ghost image ray G2 is internally-reflected at facet 304 before being emitted at facet 306. In light of the angle at which ray G2 is refracted by the Fresnel facet, the ray may pass between the absorbing stripes of a lenticular-type filter. Thus, high-angle ghost image ray G2 may appear on a display surface of a display screen.

Figure 4:
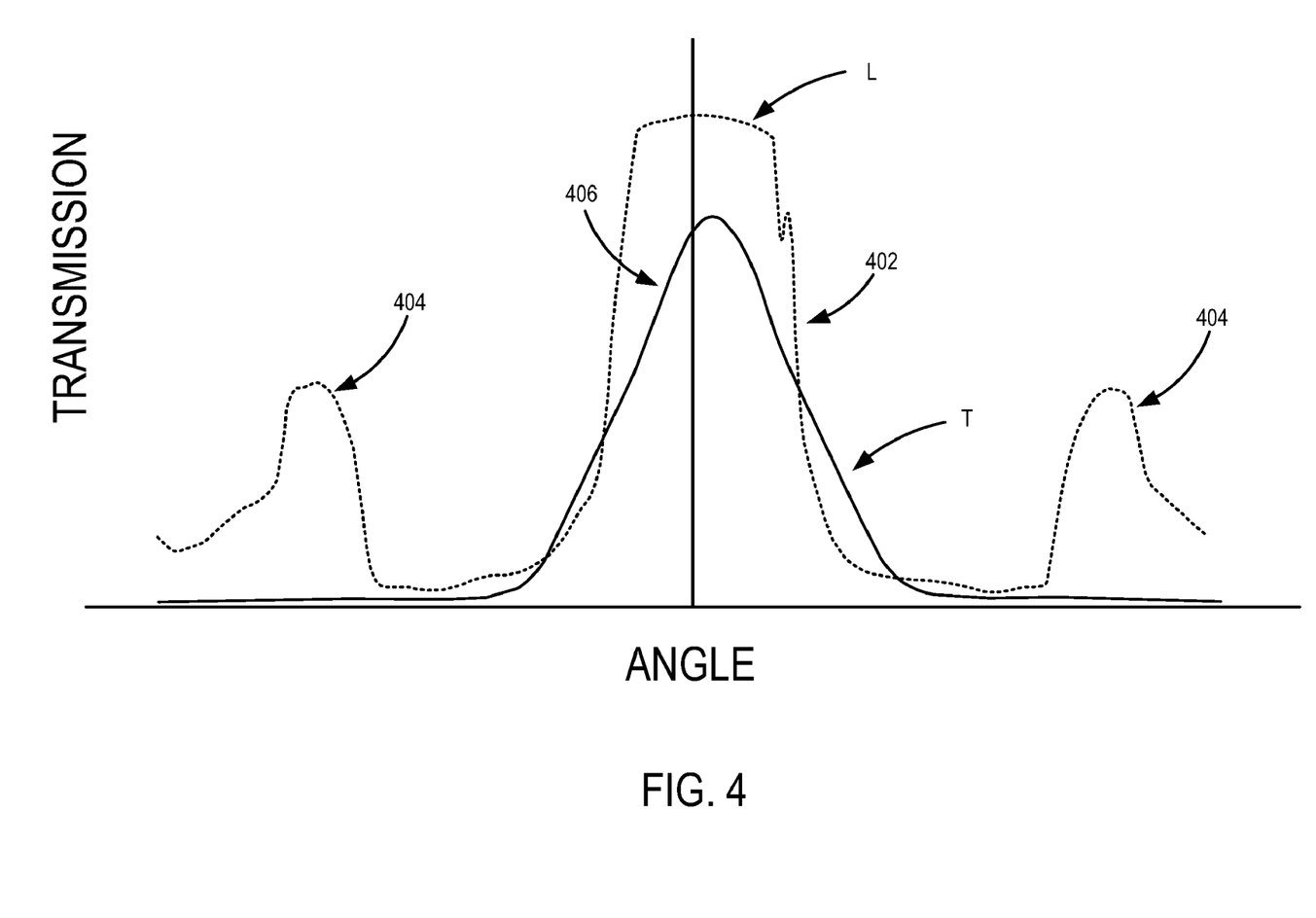
FIG. 4 shows a graphical representation of angular-dependent light transmission from two embodiments of rear projection display screens.

FIG. 4 shows a graphical comparison of angular-dependent light transmission from a display screen comprising a lenticular array with the embodiment of FIG. 2. Lenticular lens transmission curve L exhibits a low-angle main lobe transmission band 402 corresponding to image ray A and a high-angle transmission band 404 corresponding to high-angle ghost ray G2. In contrast, trapezoidal lens transmission curve T only exhibits a low-angle transmission band 406 corresponding to image ray A. Thus, it will be appreciated that a filter layer employing an array of trapezoidal transmissive elements may be more suited to reducing ghost images transmitted to a display surface than one utilizing a lenticular lens arrangement.

Display screen 106 may be subject to forces during ordinary use that bow the filter layer 202 toward the Fresnel lens 226. For example, where the display screen 106 is used as a screen for a horizontally-disposed surface computing device, users may push against the screen with excessive pressure when making touch inputs, when resting elbows on the screen, etc. Where a one-dimensional lenticular array (not shown) is used as a filter, the "bumps" of the lenticular array may be positioned sufficiently close to the facets of the Fresnel lens 226 that the facets may scratch the lenticular array when excessive pressure is pushed against the display screen. However, the use of the trapezoidal array of filter layer 202 may help to avoid such problems. This is because the wider bases of trapezoidal transmissive elements 216 and the narrower bases of the trapezoidal absorption elements 214 provide at least a portion of a planar surface 236 that faces Fresnel lens 226, and thereby may increase a closest distance between the filter layer 202 and Fresnel lens 226 compared to the use of a rear-projection lenticular array. Moreover, a reduction in damage to facets of the Fresnel lens 226 may be realized by increasing a contact area between facets of the Fresnel lens 226 and the planar surface 236 during a contact event between the two structures. It will be understood that other embodiments may utilize such a lenticular array.

Display screen 106 also comprises light diffuser 206 for diffusing light received from filter layer 202 and spreading light in a viewing direction from light emission side 240 of light diffuser 206. In a horizontally-oriented rear-projection display system, light diffuser 206 may be a low-gain diffuser, configured to produce a Lambertian or similar low-gain distribution of light, thereby facilitating viewing of an image on the screen from the screen sides, and also not directing excessive optical power along the screen normal, where it is less likely to be viewed. Light diffuser 206 may further be configured to have a matte finish to reduce specular reflection of ambient light from display surface 208. Alternatively, light diffuser 206 may be configured to have a glossy finish to provide an increased contrast ratio or to alter a color intensity of the projected image.

Light diffuser 206 may be bonded to image display side 212 of filter layer 202 on a first side of light diffuser 206. Display screen 106 may further comprise a transparent durability layer 238 disposed on light emission side 240 of light diffuser 206 to resist contact damage to display screen 106. The transparent durability layer 238 may help to resist scratches to the display surface 208 caused by a user's finger, a stylus, or other object contacting the display surface 208. The transparent durability layer may comprise any suitable material, and may be formed on light diffuser 206 in any suitable manner. Examples of suitable materials include, but are not limited to, suitably hard transparent ceramic coatings, polymer coatings, etc.

Figure 5:
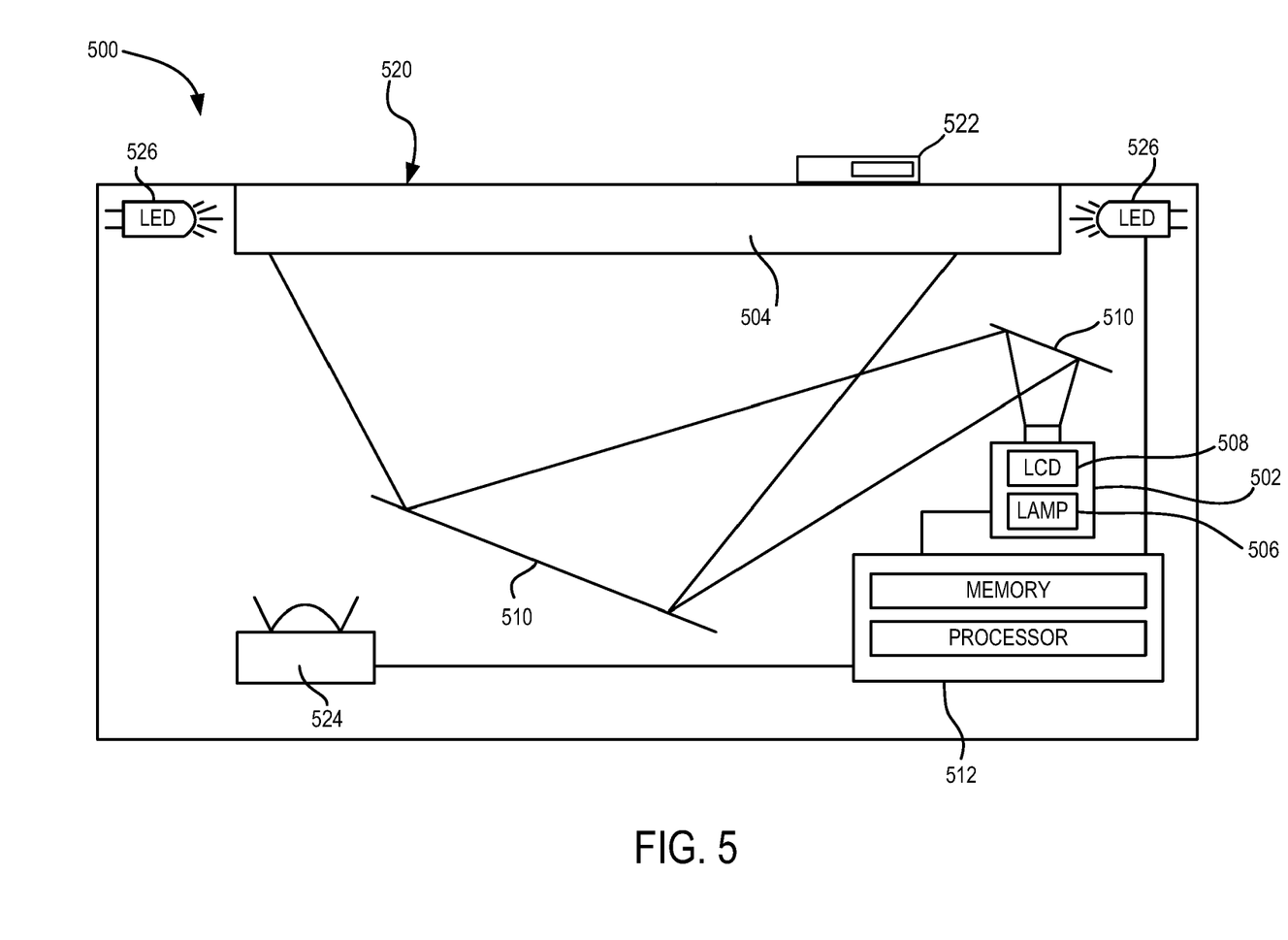
FIG. 5 shows another embodiment of a rear-projection display system.

FIG. 5 shows another example embodiment of a rear-projection display system 500 that may utilize the display screen embodiments described herein. Rear-projection display system comprises a projector 502 configured to project an image, and a display screen 504 configured to display an image projected by projector 502. Projector 502 includes a light source such as lamp 506, light-emitting diode (LED) array, etc, and also includes an image source 508, such as a liquid crystal display (LCD), digital micromirror device (DMD), etc., for producing an image. In the embodiment of FIG. 5, one or more mirrors 510 are utilized to increase an optical path length and image size of the image projected by the projector 502, instead of an optical wedge 102, to provide image conjugates between the image source 508 and the projected image of the image source 508 at or near the display surface 520. Rear projection display system 500 further comprises a controller 512 configured to control the display of an image via the projector.

The rear-projection display device 500 also comprises an image capture device 524 configured to capture an image of the backside of display screen 504. Image capture device 524 provides an image to electronic controller 512 for the detection of an object 522 on the display screen. It will be appreciated that, in some embodiments, the image capture device may be configured to capture an image of a frontside of the display screen based on one or more focusing characteristics of the display system.

An infrared light source 526 may be used to illuminate the backside of the display screen with infrared light to facilitate vision-based touch detection. In other embodiments, a visible light source may be used. However, the use of infrared light, as opposed to visible light, for vision-based touch detection may help avoid washing out of the projected image.

Other embodiments of rear-projection display system 500 may utilize other approaches to detect user touches or objects at display surface 520 of display screen 504. For example, display surface 520 may include capacitive or resistive touch sensor mechanisms (not illustrated) configured to communicate with electronic controller 512, an external computing device, a network, etc.

Figure 6:
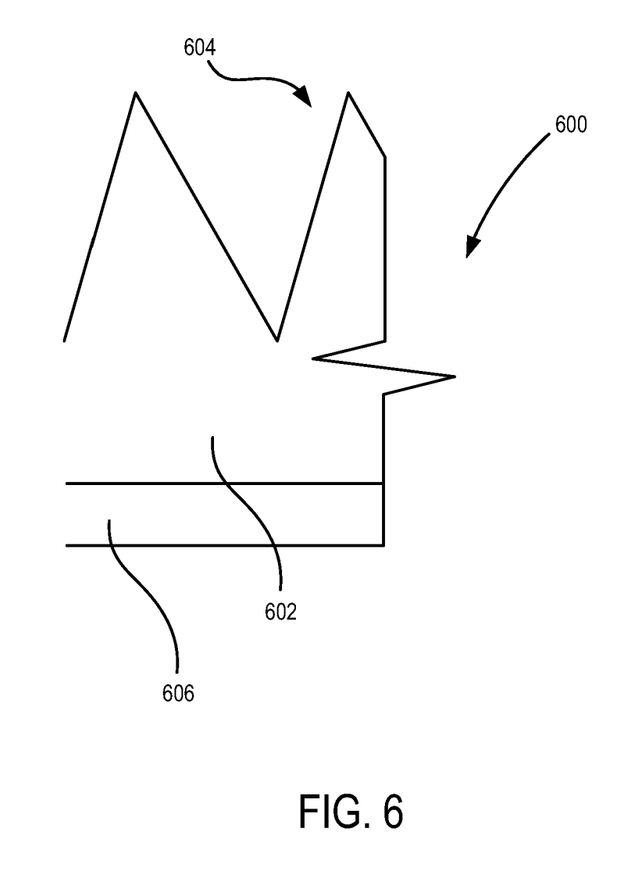
FIG. 6 illustrates an embodiment of a lens sheet.

FIG. 6 illustrates another embodiment of a lens sheet in which the Fresnel lens and mechanical strength layer comprise a single layer of material. As such, lens sheet 600 is formed from a rigid sheet of material 602, and comprises a Fresnel lens 604 molded, embossed, or otherwise directly formed thereon to direct projected light to filter layer 202. Lens sheet 600 further comprises a second side coated with an anti-reflective layer 606 to help prevent the generation of ghost images arising from the reflection of a projected image from the second side of the lens sheet. As elsewhere, it will be appreciated that the sizes of the various parts depicted in lens sheet 600 are neither to scale nor intended to represent any size relationships among those parts, but instead are sized to clarify the arrangements and locations of the parts.

It will be appreciated that, for some embodiments of rear-projection systems where incoming light has a high incidence angle with respect to a surface normal of the lens sheet, a portion of the light may be reflected from the lens sheet, causing ghost images to form. To address this in part, some embodiments may include a total internal reflection (TIR) Fresnel lens or a combination Fresnel-TIR Fresnel transition lens disposed adjacent the second side of the lens sheet in place of and/or in addition to a Fresnel lens disposed on the first side of the lens sheet. In such situations, the anti-reflective layer described above may be modified or omitted according to the embodiment of the display system.

While disclosed herein in the context of specific example embodiments, it will be appreciated that the display screen embodiments described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A rear-projection display device for displaying an image, comprising:
    a projector configured to project an image; and
    a screen configured to display an image projected by the projector, the screen including a filter layer and a light diffuser configured to diffuse light received from the filter layer, the filter layer comprising a light reception side and an image display side, the filter layer further comprising:
        an array of trapezoidal transmissive elements with a wider base of each trapezoidal transmissive element facing the light reception side of the filter layer, and
        an array of trapezoidal absorption elements with a wider base of each trapezoidal absorption element facing the image display side of the filter layer.

2. The rear-projection display device of claim 1, the screen further comprising a lens sheet spaced from the filter layer, the lens sheet being formed from a rigid sheet of material and having a first side comprising a Fresnel lens to direct light to the filter layer and a second side coated with an anti-reflective layer.

3. The rear-projection display device of claim 1, wherein the screen further comprises:
    a rigid mechanical strength layer having a first side and a second side;
    a Fresnel lens bonded to the first side of the rigid mechanical strength layer; and
    an anti-reflective layer disposed on the second side of the rigid mechanical strength layer.

4. The rear-projection display device of claim 3, wherein the filter layer further comprises a planar surface that faces the Fresnel lens.

5. The rear-projection display device of claim 1, wherein each of the trapezoidal absorption elements is configured to have a higher transmittance of one or more wavelengths of infrared light than of one or more wavelengths of visible light.

6. The rear-projection display device of claim 1, the screen further comprising a transparent durability layer disposed on a light emission side of the light diffuser to resist contact damage to the screen.

7. The rear-projection display device of claim 1, wherein the screen further comprises a touch sensor.

8. The rear-projection display device of claim 7, further comprising:
    an infrared light source configured to illuminate the screen with infrared light; and
    an infrared image capture device configured to capture an image of the screen at one or more infrared wavelengths emitted by the infrared light source.

9. The rear-projection display device of claim 1, further comprising an optical wedge configured to receive projected light from the projector and transmit projected light to the screen.

10. A horizontally-oriented rear-projection display system, comprising:
   a projector configured to project light; and
   a display screen configured to display an image projected by the projector, the display screen comprising:
      a mechanical strength layer having a first side and a second side opposing the first side, the first side coated with an anti-reflective layer;
      a Fresnel lens disposed on the second side of the mechanical strength layer;
      a filter layer spaced from the Fresnel lens and configured to receive light from the Fresnel lens, the filter layer comprising:
         a light reception side positioned to receive projected light exiting the Fresnel lens,
         an image display side located opposite the light reception side of the filter layer,
         an array of trapezoidal transmissive elements arranged between the light reception side and the image display side such that a wider base of each transmissive element faces the light reception side of the filter layer, and
         an array of trapezoidal absorption elements arranged between the light reception side and the image display side such that a wider base of each absorption element faces the image display side of the filter layer, each absorption element having a higher absorbance than transmittance of one or more visible wavelengths and a higher transmittance than absorbance of one or more infrared wavelengths; and
      a light diffuser configured to diffuse projected light received from the filter layer.

11. The horizontally-oriented rear-projection display system of claim 10, further comprising an optical wedge configured to transmit projected light from the projector to the display screen.

12. The horizontally-oriented rear-projection display system of claim 10, wherein the display screen further comprises a touch sensor.

13. The horizontally-oriented rear-projection display system of claim 12, further comprising:
   an infrared light source configured to illuminate the display screen with infrared light; and
   an infrared image capture device configured to capture an image of the display screen at one or more infrared wavelengths emitted by the infrared light source.

14. The horizontally-oriented rear-projection display system of claim 10, wherein the wider bases of the trapezoidal transmissive elements form at least a portion of a planar surface of the light reception side of the filter layer.

* * * * *